United States Patent
Kitamura

[11] Patent Number: 5,369,430
[45] Date of Patent: Nov. 29, 1994

[54] PATTER CORRELATION TYPE FOCUS DETECTING METHOD AND FOCUS DETECTING APPARATUS

[75] Inventor: Toshiaki Kitamura, Yokohama, Japan

[73] Assignee: Nikon Corporation, Tokyo, Japan

[21] Appl. No.: 974,895

[22] Filed: Nov. 12, 1992

[30] Foreign Application Priority Data

Nov. 14, 1991 [JP] Japan .................................. 3-326442

[51] Int. Cl.$^5$ ............................................. H04N 5/232
[52] U.S. Cl. ........................... 348/94; 348/130; 348/345
[58] Field of Search ............... 358/227, 101, 209, 909; 382/8, 42; 348/86, 94, 95, 345, 349, 130

[56] References Cited

U.S. PATENT DOCUMENTS

| | | | |
|---|---|---|---|
| 4,829,374 | 5/1989 | Miyamoto et al. | 358/227 X |
| 4,972,311 | 11/1990 | Holdgrafer et al. | 358/101 X |
| 5,040,228 | 8/1991 | Bose et al. | 358/227 X |
| 5,101,277 | 3/1992 | Kamata | 358/227 |
| 5,119,435 | 6/1992 | Berkin | 382/8 |
| 5,179,419 | 1/1993 | Palmquist et al. | 382/8 X |
| 5,204,739 | 4/1993 | Domenicali | 358/101 X |

Primary Examiner—Michael T. Razavi
Assistant Examiner—Wendy R. Greening
Attorney, Agent, or Firm—Shapiro & Shapiro

[57] ABSTRACT

A focus detecting method includes the step of projecting the real image of an observation object including a plurality of object patterns onto an image pickup device through an optical system and producing image data from an output of the image pickup device, the step of calculating correlation values of the image data of each of the plurality of object patterns and the image data of a prestored reference pattern while varying the relative positional relation among the image pickup device, the optical system and the observation object in the direction of the optical axis of the optical system, and the step of judging a relative positional relation giving the maximum correlation value as an in-focus state. An apparatus is provided for carrying out the above-described focus detecting method.

9 Claims, 9 Drawing Sheets

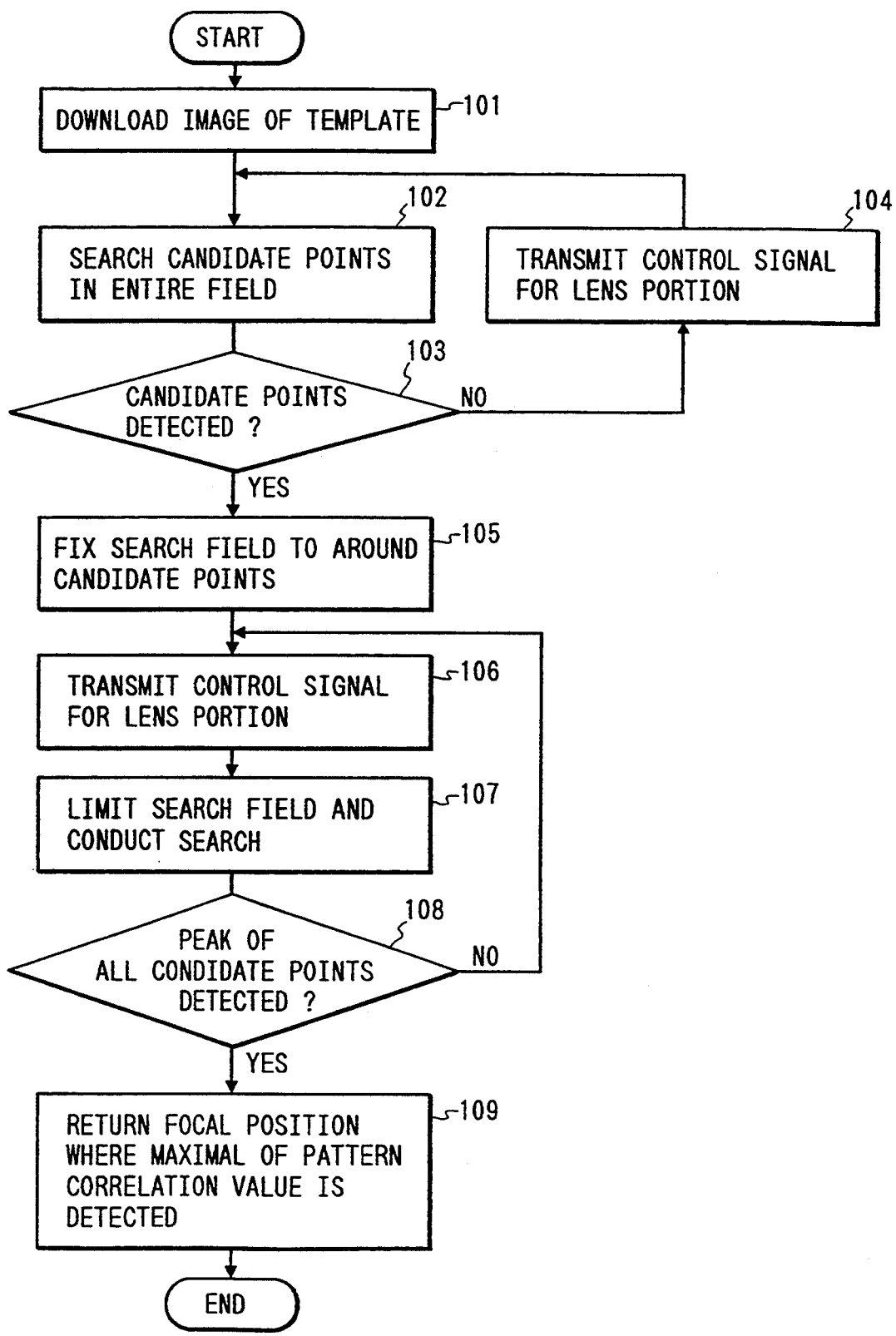

PATTER CORRELATION TYPE FOCUS DETECTING METHOD AND FOCUS DETECTING APPARATUS

BACKGROUND OF THE INVENTION

1. Field of the Invention

This invention relates to a focus detecting method and a focus detecting apparatus suitable for application, for example, to the auto focus mechanism portion of a semiconductor inspecting apparatus for recognizing and inspecting a predetermined pattern from among objects to be inspected or a video camera.

2. Related Background Art

A semiconductor inspecting apparatus for recognizing and inspecting a predetermined pattern from among objects to be inspected or a video camera used for common people's livelihood is provided with an auto focus mechanism for grasping the clear-cut real image of an image pickup object always on an image pickup element. As automatic focus detecting methods for an image pickup object, there are usually used an active method of applying illuminating light or laser light for focal position detection to the image pickup object and monitoring any variation in the intensity of reflected light to thereby effect focusing, and a passive method of detecting the signal of the edge portion of any pattern from a picked-up image signal and controlling the focal position so that the image may become sharpest.

The active method is often used, for example, for microscopic observation images or the like. The passive method is often used, for example, for the automatic focusing or the like of video cameras.

However, in case of the active method, the detection object of the focal position is limited only to the image pickup object surface in a predetermined focal position detection area. Therefore, where the position of the image pickup object gradually deviates in the image field, there is the possibility of focusing being effected on a different image pickup object surface. On the other hand, where the passive method is used, if a plurality of objects differing in distance exist in the image field, there is the possibility of focusing being effected on an object not intended by the operator, depending on which object is selected as the object of edge detection.

That is, the focus detecting methods according to the prior art have suffered from the inconvenience that focusing can be effected only on a particular pattern or a particular object irrespective of the position thereof in the image field. Even in the focus detecting methods according to the prior art, if, for example, the operator changes the focus detection area in the image field in pursuit of the movement of an image pickup object, focusing can be effected on that image pickup object, but this not only requires a long processing time but also is bad in operability.

SUMMARY OF THE INVENTION

In view of the above-noted point, the present invention has as an object thereof the provision of a focus detecting method which can accomplish focus detection to a particular pattern or a particular object irrespective of the position thereof in the image field.

The present invention has as a further object thereof the provision of a focus detecting apparatus directly usable to carry out such a focus detecting method.

The focus detecting method according to the present invention is such that as shown, for example, in FIG. 1 of the accompanying drawings, the real image of an observation object 9 including a plurality of object patterns is projected onto an image pickup device 11 through an optical system 10, image data obtained from the image pickup device 11 is introduced (into an image memory 2), correlation values of the image data of each of the plurality of object patterns and the image data of a reference pattern prestored (in an external store 3) are calculated while at least one of the image pickup device 11, the optical system 10 and the observation object 9 is varied in the direction of the optical axis of the optical system 10 and the relative positional relation therebetween is varied, and a relative positional relation which gives the maximum correlation value is judged as an in-focus state.

In this case, design may be made such that when the image pickup device 11, the optical system 10 and the observation object 9 are in a certain relative positional relation, the correlation value of the image data of each of the plurality of object patterns and the image data of the reference pattern is found and an object pattern of which are correlation value is a predetermined value or greater is selected from among the plurality of object patterns and further, the relative positional relation among the image pickup device 11, the optical system 10 and the observation object 9 is shifted from said certain relative positional relation to a relative positional relation differing therefrom, and the correlation value of the image data of said selected object pattern and the image data of said reference pattern is found.

Design may also be made such that when the real image of the observation object is to be displayed on a screen (a CRT display 5) on the basis of the image data obtained from the image pickup device 11, at least one of the real image of the observation object 9 and the image pickup device 11 is relatively moved in a direction perpendicular to the optical axis of the optical system 10 so that one of the plurality of object patterns of which the correlation with the reference pattern is highest may come to a predetermined position on the image field.

Also, the focus detecting apparatus according to the present invention, as shown, for example, in FIG. 1, has an image pickup device 11 for picking up the real image of an observation object 9 including a plurality of object patterns through an optical system 10, drive means 13 for driving at least one of the image pickup device 11, the optical system 10 and the observation object 9 in the direction of the optical axis of the optical system, first memory means 2 for storing therein the image data of the object patterns obtained from the image pickup device 11, second memory means 3 prestoring the image data of a reference pattern therein, correlation value calculating means for calculating correlation values of the image data in the first memory means 2 and the image data in the second memory means 3 while controlling the drive means 13 to thereby vary the relative positional relation among the image pickup device 11, the optical system 10 and the observation object 9, and judging means 1 for judging a relative positional relation which gives a maximum value to said correlation value as an in-focus state.

According to such focus detecting method of the present invention, the image data of the reference pattern which is the reference of focus detection is prestored (registered). For example, pattern matching is effected to recognize an object pattern identical or similar to the reference pattern from among the images of the observation object including the plurality of object patterns. When the degree of coincidence between the reference pattern and the object patterns is made into a numerical correlation value of pattern, the correlation values of pattern at positions whereat object patterns having high correlation with the reference pattern exist (hereinafter referred to as candidate points) exhibit different curves for a variation in the focal position. In this case, if the relative positional relation among the image pickup device and the optical system and the observation object is gradually changed in the direction of the optical axis of the optical system, when the focus on an object pattern identical or similar to the reference pattern among the images of that observation object is detected, the correlation value of pattern becomes maximum and therefore, focus detection can be accurately effected for the object pattern identical or similar to the reference pattern.

Also, when the focal position changes and the image of the matching object pattern becomes a blurred image, the correlation value of pattern becomes gradually lower and the relation of the focal position and the correlation value of pattern to the object pattern identical or similar to the reference pattern becomes a function which assumes a maximum value at the focal point as shown, for example, in FIG. 3 of the accompanying drawings (hereinafter referred to as the "focal point evaluation function"). On the other hand, for a pattern differing from the registered reference pattern, even if the focal position is changed, there will not be obtained the focal point evaluation function as shown in FIG. 3 which assumes a high peak at the focal point. Likewise, when there is no pattern identical or similar to the registered reference pattern, the correlation value of pattern assumes a very low level and in any case, focus detection is not effected.

Accordingly, the focal position is changed toward the peak of the correlation value of pattern in accordance with the focal point evaluation function of FIG. 3 obtained for only the object pattern identical or similar to the registered reference pattern, whereby the focusing operation is executed.

Description will now be made of the operational effect when the normalization of the gradation of the introduced image data is effected. Generally, it is necessary that the focal point evaluation function be of a shape which exhibits a great peak at a correct focal point, as shown in FIG. 3. For that purpose, however, a predetermined appropriate preprocess is sometimes necessary during the preparation of the image data of the reference pattern and during the introduction of the image data of the observation object. For example, the original image data of the observation object is multivalue gradation, and when binary images are compared with each other during comparison, it is necessary that the image data of the multivalue gradation be binarized. For the binarization, it is necessary to set a threshold value level. However, when, for example, for the image data of FIG. 10A of the accompanying drawings, three threshold value levels th1-th3 are set as shown in FIG. 10B of the accompanying drawings, the focal point evaluation function for the threshold value level th2 becomes as indicated by a function 22 in FIG. 10C of the accompanying drawings, and the focal point evaluation function for the threshold value level th1 or th3 becomes as indicated by a function 23 in FIG. 10C and thus, there is sometimes obtained an unsuitable focal point evaluation function, depending on the manner of setting the threshold value levels.

In contrast, in the present invention, for example, for the image data of FIG. 8A of the accompanying drawings, the normalization of gradation is effected so that as shown in FIG. 8B of the accompanying drawings, the difference between the maximum value and the minimum value of the image data may become a predetermined value (e.g. a maximum difference value). It has been found that according to this, a substantially constant function which assumes a great peak at the focal point as shown in FIG. 9 of the accompanying drawings is always obtained as the focal point evaluation function. Accordingly, when the current correlation value of pattern is found, the difference in the focal position to the focal point can be estimated considerably accurately and focus detection can be effected at a higher speed.

Also, if design is made such that after candidate points of high correlation with the reference pattern are found, one of those candidate points which has the highest correlation comes to a predetermined position on the observation screen, focusing and alignment can be executed at a time for an object pattern identical or similar to the registered reference pattern.

Also, according to the focus detecting apparatus of the present invention, the above-described focus detecting method can be intactly carried out as an alignment method for a particular pattern.

BRIEF DESCRIPTION OF THE DRAWINGS

FIG. 4 is a flow chart showing the focusing operation of the first embodiment.

DESCRIPTION OF THE PREFERRED EMBODIMENTS

Some embodiments of the present invention will hereinafter be described with reference to the drawings. A first embodiment is one in which the present invention is applied to the automatic focus detecting apparatus of an image processing apparatus for recognizing a predetermined pattern from among images in an image field.

First Embodiment

Figure 1:
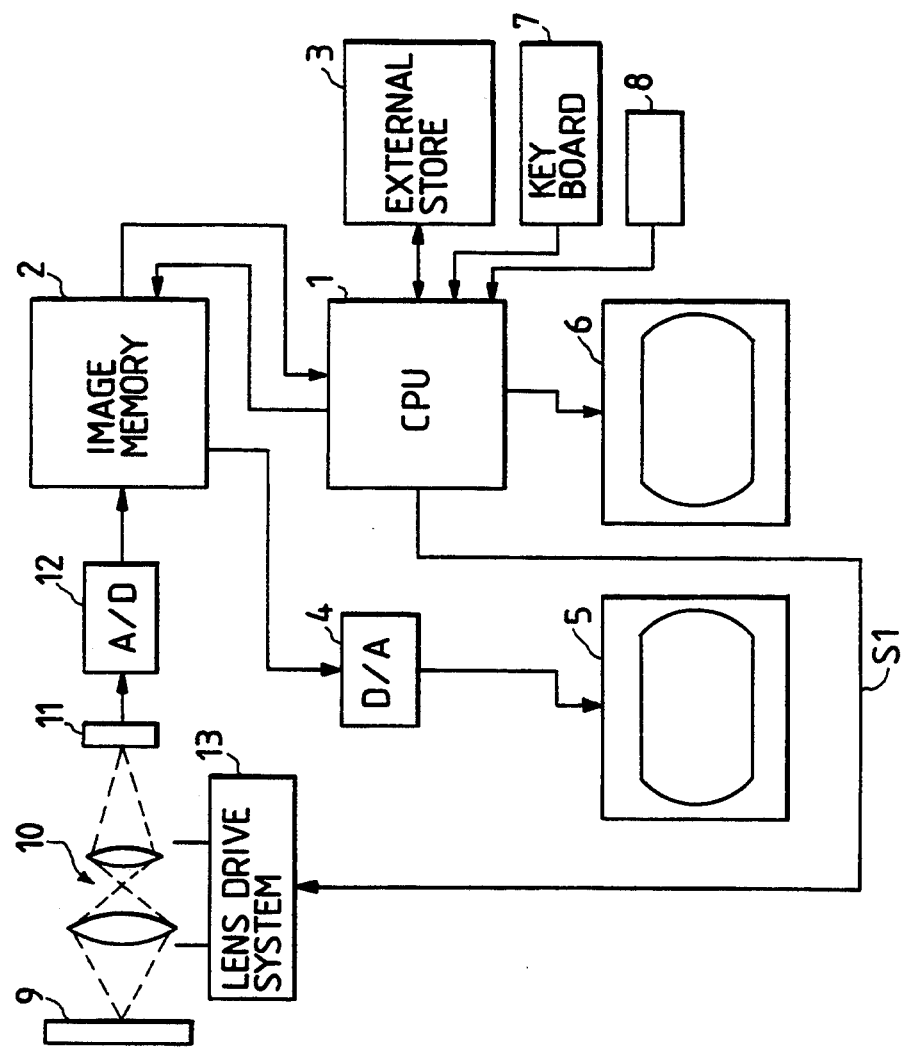
FIG. 1 is a block diagram showing the basic construction of a first embodiment of the present invention.

Referring to FIG. 1 which shows the basic construction of the hardware of the first embodiment, the reference numeral 1 designates a central processing unit (hereinafter abbreviated as "CPU") for controlling the operation of the entire apparatus, the reference numeral 2 denotes an image memory comprising a random access memory (RAM), and the reference numeral 3 designates an external store comprising, for example, a hard disk device. The reference numeral 4 denotes a digital/analog (D/A) converter, and the reference numeral 5 designates an image display. The image data in the image memory 2 is supplied to the image display 5 through the D/A converter 4. Thereby, an image corresponding to the image data stored in the image memory 2 is intactly displayed on the image display 5.

The CPU 1 writes, for example, the image data of a cursor or the like into the image memory 2 and also causes the external store 3 to store therein the image data of a reference pattern (hereinafter referred to as the "template") which provides the reference of focus detection. The CPU 1 further calculates the correlation between the image data read out from the image memory 2 and the image data read out from the external store 3, and effects focus detection which will be described later in conformity with the result of the calculation. The reference numeral 6 designates a CRT display for the CPU 1, and the reference numerals 7 and 8 denote a keyboard and a simple coordinates input unit (for example, a mouse or the like), respectively, which are connected to the CPU 1. The operator operates the keyboard 7 and the coordinates input unit 8 to thereby make the CPU 1 execute a desired operation while watching the CRT display 6.

The reference numeral 9 designates a sample (an observation object), the reference numeral 10 denotes an optical system for observation, and the reference numeral 11 designates an image pickup element such as a charge coupled type image pickup device (CCD). The real image of the sample 9 at a predetermined magnification is formed on the image pickup surface of the image pickup element 11 through the optical system 10. Image pickup signals output from the image pickup element 11 are successively written into the image memory 2 through an analog/digital (A/D) converter 12. The reference numeral 13 denotes a lens drive system for effecting the focus adjustment of the optical system 10. The CPU 1 supplies a lens portion control signal S1 to the lens drive system 13, whereby the focus adjustment of the optical system 10 is effected.

Description will now be made of the procedure when in the image processing apparatus of the present embodiment, the image data of the template which provides the reference of focus detection is registered.

Figure 2:
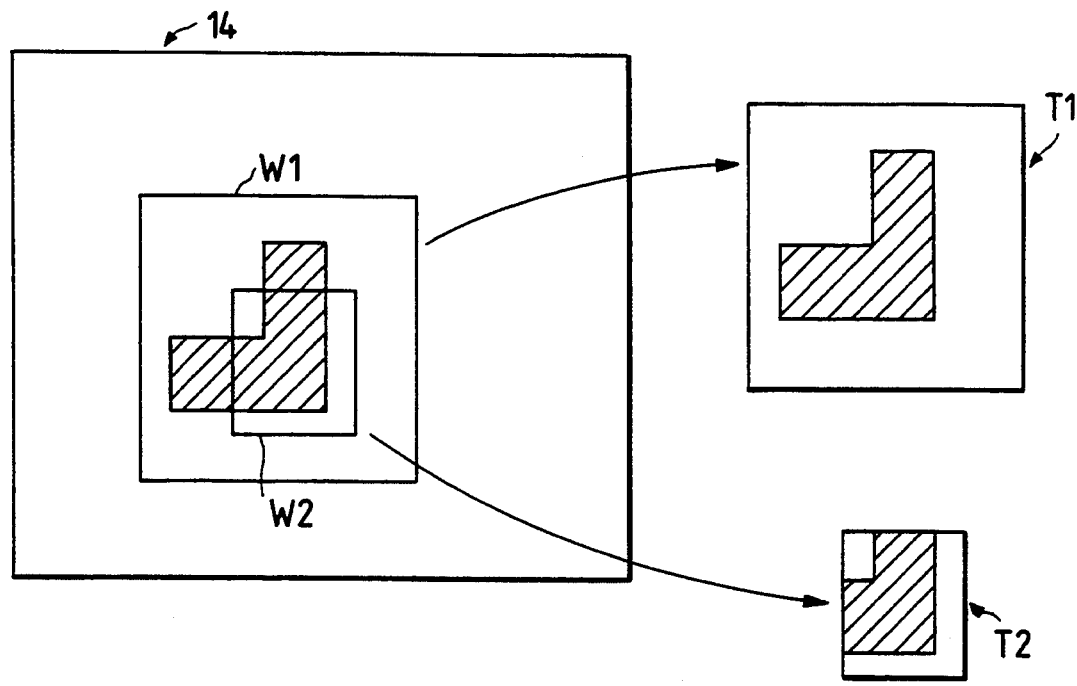
FIG. 2 is a diagram used for the illustration when the image data of templates are registered in the first embodiment.

The image of the sample 9 including a plurality of object patterns is first picked up by the image pickup element 11, and then image data output from the image pickup element 11 is written into the image memory 2 through the A/D converter 12, and the image data written into this image memory 2 is supplied to the image display 5 through the D/A converter 4. Thereby, as shown in FIG. 2, an image corresponding to data 14 on the image memory 2 (i.e., the predetermined magnified real image of the sample 9) is displayed on the image display 5. At this time, the operator effects focusing through the CPU 1 and the lens drive system 13 so that for example, the image which is the template in the image being displayed on the image display 5 may become most clear-cut.

Thereafter, the operator designates a rectangular window on the screen of the image display 5 by the use of the coordinates input unit 8, whereupon the image data on the image memory 2 which corresponds to the image in this window is taken out by the CPU 1, and the thus taken-out image data is stored (i.e., registered) as the image data of the in-focus state of the template in the external store 3. As the template, various kinds of templates are registered in conformity with observation objects.

At this time, as shown in FIG. 2, two kinds of windows, i.e., a relatively large window W1 and a relatively small window W2, may be prepared, and the image data of a rough template T1 and the image data of a fine template T2 may be cut out by the use of these two kinds of windows W1 and W2, and the thus cut-out image data of the two kinds of templates may be registered in the external store 3. The rough template T1 is used to effect focusing at a high speed, and the fine template T2 is used to effect focusing highly accurately.

The operation when auto focusing is effected by the use of the registered image data of the templates will now be described with reference to the flow chart of FIG. 4. First, at the step 101 of FIG. 4, the operator downloads the image data of the template preselected from within the external store 3 into the CPU 1. Thereafter, at a step 102, the operator sets the sample 9 including a plurality of object patterns in front of the optical system 10, whereupon the image data of the sample 9 is written into the image memory 2. Then, the search of positions in the entire image field of the sample at which object patterns having a high correlation with the reference pattern exist (hereinafter referred to as the candidate points) is effected by the CPU 1. Specifically, the CPU 1 calculates the distribution of the degree of coincidence with the image data of the templates in all the image data on the image memory 2 (the degree of coincidence as it is made into a numerical value is referred to as the "correlation value of pattern"), and extracts a portion in which the correlation value of pattern is greater than a threshold value as a candidate point.

When no candidate point is detected, the operation of the CPU 1 shifts from a step 103 to a step 104, where the CPU 1 transmits a control signal for lens portion to the lens drive system 13. In conformity therewith, the focus adjustment of the optical system 10 is effected, and the real image of the sample 9 as its focus state has changed is formed on the image pickup element 11, and at the step 102, the search of candidate points is effected again with this image as an object.

Figure 3:
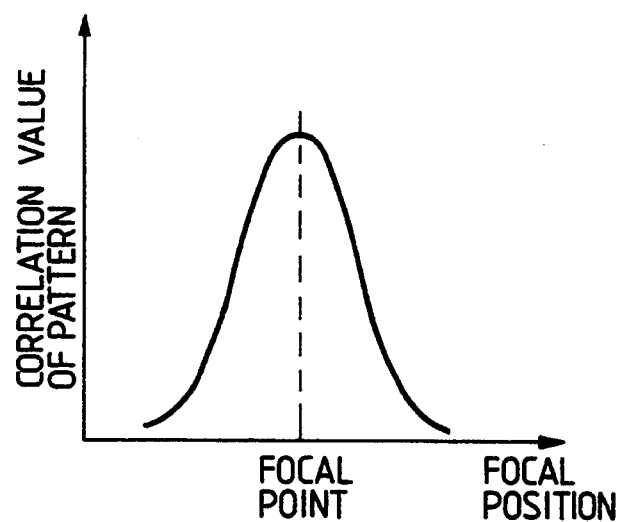
FIG. 3 is a graph showing an example of the focal point evaluation function used in the first embodiment.

When candidate points are detected, the operation of the CPU 1 shifts from the step 103 to a step 105, where the search field of the data on the image memory 2 is fixed around the already extracted candidate points. At the subsequent step 106, the CPU 1 transmits the control signal S1 for lens portion to the lens drive system 13, whereby the image data of the sample 9 as its focus state has changed is written into the image memory 2. At a step 107, the CPU 1 calculates the correlation value of pattern with the image data of the templates, only regarding the surroundings of those candidate points, and records the correlation value of pattern correspondingly to the focal position. Generally, when the correlation value of pattern is recorded correspondingly to the focal position, there is obtained a "focal point evaluation function" which assumes a high peak at the focal point as shown in FIG. 3.

Until the peak of the focal point evaluation function is detected at all candidate points, the operation of the CPU 1 returns from a step 108 to the step 106 and the calculation of the correlation value of pattern around the candidate points is repetitively executed. When the peak of the focal point evaluation function is detected at all candidate points, the operation of the CPU 1 shifts from the step 108 to a step 109, where the focus state is finally returned to a focal position at which the correlation value of pattern becomes highest. This is executed by the CPU 1 controlling the lens drive system 13 through the control signal S1 for lens portion, by the use, for example, of the popular signal ascending method.

Figure 5A:
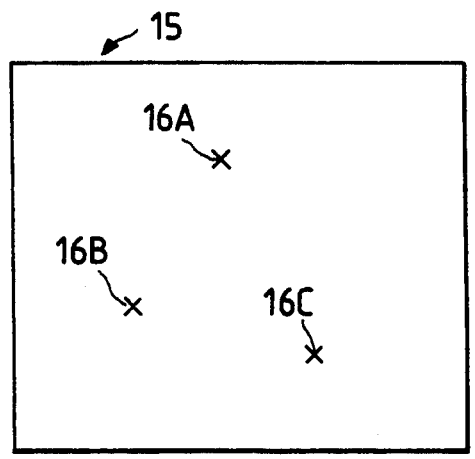
FIGS. 5A and 5B are graphs used for the illustration of candidate points detected in the process of the focusing operation of the first embodiment.

By way of example, assume that three candidate points 16A–16C are first obtained in the observation image field 15 by the search of candidate points, as shown in FIG. 5A. The focal point evaluation functions at these candidate points 16A–16C become the functions 17A–17C, respectively, of FIG. 5B, and it is the focal point evaluation function 17A at the candidate point 16A that is highest in the peak of the correlation value I of pattern. From this, it is seen that a pattern identical or similar to the template exists only at the candidate point 16A. The focal position is then adjusted to the peak point of the function 17A, whereby focus detection is effected for the pattern identical or similar to the template.

Figure 5B:
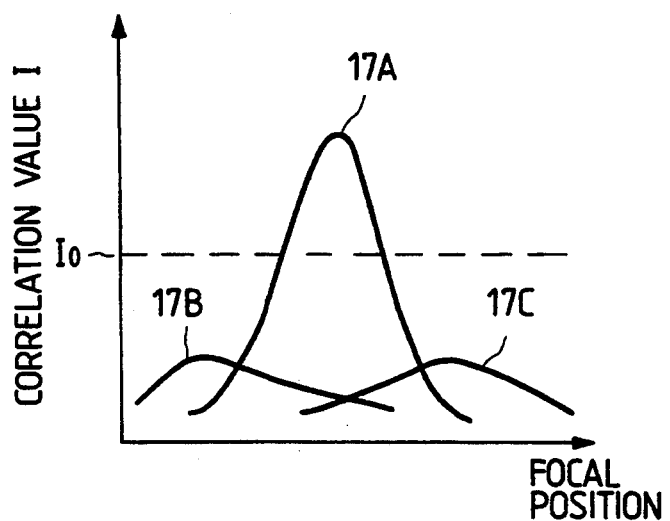

Also, the secondary peaks of the correlation values of pattern obtained at the other candidate points 16B and 16C than the correct candidate point 16A assume levels sufficiently lower than the peak signal intensity obtained at the correct candidate point. So, as shown in FIG. 5B, a threshold value $I_0$ may be set for the correlation value I of pattern, and during the judgment of the detection of the candidate points at the step 103 of FIG. 4, only that portion of the correlation value I of pattern which exceeds the threshold value $I_0$ may be regarded as a candidate point. By such narrowing of the candidate point, focus detection can be improved.

Figure 6A:
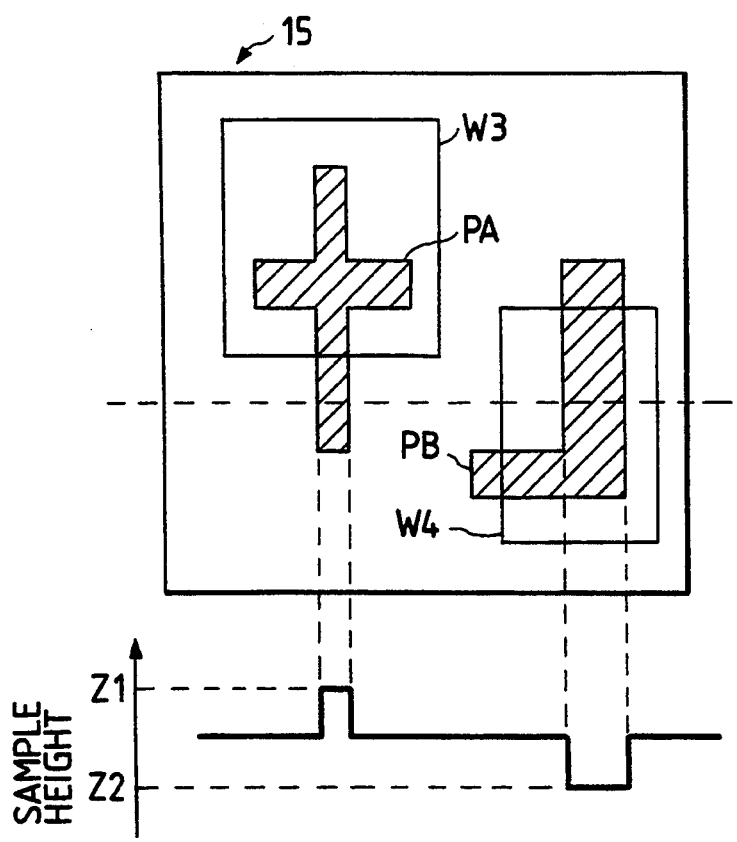
FIGS. 6A, 6B and 6C are diagrams used for the illustration when the image data of templates of different heights are registered in the first embodiment.
Figure 6B:
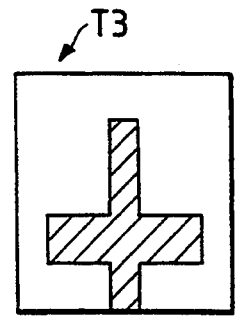
Figure 6C:
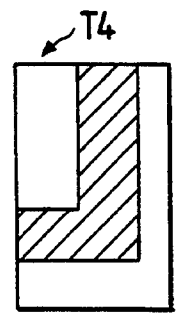
Figure 7:
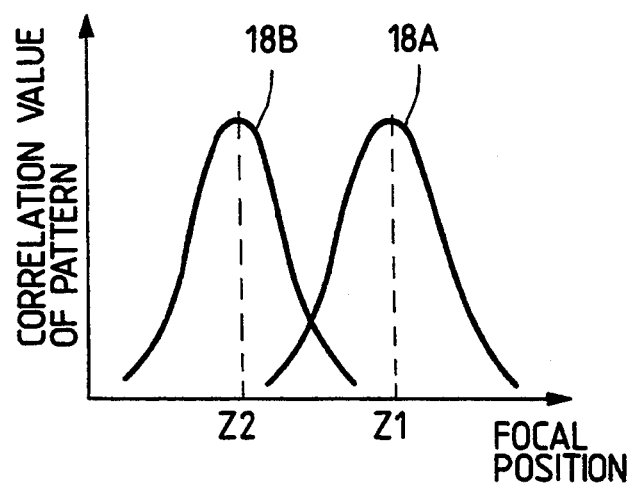
FIG. 7 is a graph showing two focal point evaluation functions obtained by the use of the two templates of FIGS. 6A to 6C.

As described above, according to the present embodiment, the image data of the template is registered in advance, whereafter the correlation value of pattern of the object pattern on the observation screen and the templates is found while the optical system 10 is moved in the direction of the optical axis to thereby vary the relative positional relation among the image pickup device 11, the optical system 10 and the sample 9, and a relative positional relation for which the correlation value of pattern becomes highest is regarded as the in-focus state. Accordingly, at whatever position on the image field an object pattern identical or similar to that template may exist, focusing can always be effected on that pattern.

Where the shapes of patterns which are the objects to be registered as templates have level differences as shown in FIG. 6A, focusing is effected on the respective patterns, and then the image data are registered. That is, it being understood that two patterns PA and PB to be registered as templates exist within the observation screen 15 of FIG. 6A, it is to be understood that the heights of these patterns PA and PB on the sample are Z1 and Z2 (Z1>Z2), respectively. In this case, to resister the image data of the pattern PA, the pattern PA on the observation screen 15 is surrounded by a window W3 with the focus adjusted to the height Z1 on the sample. The image data of the area surrounded by this window W3 (FIG. 6B) is registered as the image data of a first template T3. Subsequently, the pattern PB on the observation screen 15 is surrounded by a window W4 with the focus adjusted to the height Z2 on the sample. The image data of the area surrounded by this window W4 (FIG. 6C) is registered as the image data of a second template T4. It is to be understood that after the image data of FIGS. 6B and 6C are registered as the image data of the templates, the operation shown in FIG. 4 is executed with the observation screen 15 of FIG. 6A as the object of focus detection. In this case, if the image data of FIG. 6B is used, there is obtained a focal point evaluation function indicated by the function 18A of FIG. 7, and by adjusting the focal position to the peak of the function 18A, the focus can be adjusted to the pattern PA of FIG. 6A. On the other hand, if the image data of FIG. 6C is used, there is obtained a focal point evaluation function indicated by the function 18B of FIG. 7, and by adjusting the focal position to the peak of the function 18B, the focus can be adjusted to the pattern PB of FIG. 6A. Thereby, focus detection can be effected accurately irrespective of the heights of the templates.

Further, in the example shown, for instance, in FIG. 5A, the candidate point 16A is finally regarded as a pattern most similar to the template and the automatic focusing operation is executed so that the image of the candidate point 16A may be most clear-cut, but design may be made such that the automatic aligning operation is executed at the same time. In this automatic aligning operation, the position of the sample 9 of FIG. 1, the direction of the optical system 10 or the position of the image pickup element 11 is adjusted, whereby adjustment is effected so that patterns identical or similar to the templates may always come to predetermined positions within the observation screen 15. More specifically when, for example, in FIG. 5A the candidate point 16A is regarded as most similar to the template, the amount of deviation between the position of that candidate point 16A on the observation screen 15 and a predetermined position is detected. The CPU 1 of FIG. 1 modifies the relative positional relation between the real image of the sample 9 and the image pickup element 11 so as to negate this amount of deviation. When the in-focus state is varied by this automatic aligning operation, the automatic focusing operation is also executed together.

Second Embodiment

A second embodiment of the present invention will now be described. The basic construction of the hardware of the present embodiment is the same as the construction (FIG. 1) of the first embodiment, and the image data of a template is prepared in a procedure similar to that in the first embodiment. In the present embodiment, however, the normalization of gradation is effected when the image data of a template is registered.

Figure 8A:
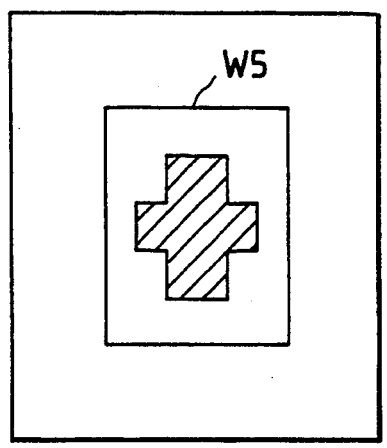
FIGS. 8A and 8B are graphs used for the illustration of the gradation normalizing operation of a second embodiment of the present invention.
Figure 8B:
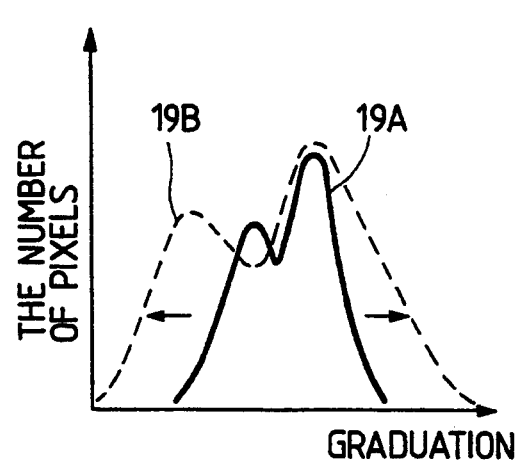

Assuming that the template to be registered is a pattern in the window W5 of FIG. 8A, it is to be understood that the distribution of the gradation of all pixels in the window W5 at the stage of raw data is represented by the solid line 19A of FIG. 8B. In the distribution indicated by this solid line 19A, there are many pixels of levels in the vicinity of the center. So, in the present embodiment, the maximum value and minimum value of the gradation in the distribution indicated by the solid line 19A are detected and the distribution of the gradation is adjusted so that the actually measured maximum value and minimum value may become the theoretical maximum value and minimum value, respectively, of the gradation. Thereby, as indicated by the broken line 19B of FIG. 8B, there is registered such image data that the width of the distribution of the gradation has a maximum value. This means that the image data of the template is registered after normalization so that light and shade may become clearer.

Figure 9:
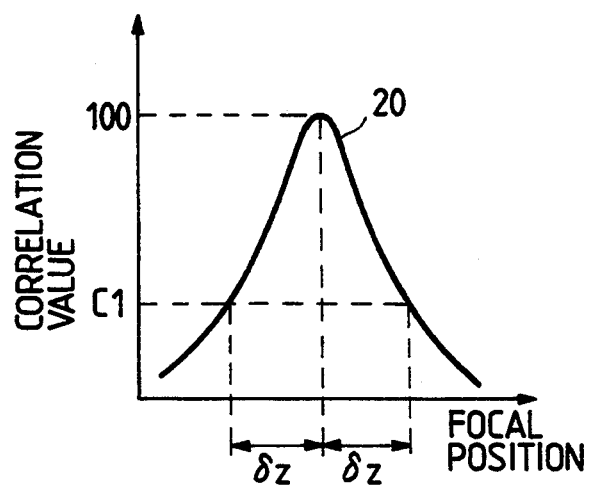
FIG. 9 is a graph showing a normalizing correlation search model curve used in the second embodiment.

Subsequently, by the use of the image data of the template of which the gradation has been normalized, the search of candidate points is effected for a sample in the same manner as in the first embodiment. Again in this case, the correlation value of the focal point evaluation function of a candidate point at which the highest correlation value of pattern has been obtained is evaluated as an absolute value. 1 It is herein referred to as "normalization correlation search" that the search of candidate points is effected by the use of the image data of the thus normalized template. Normalization correlation search is effected on a pattern identical or similar to that template, whereby a normalization correlation search model curve 20 as shown in FIG. 9 is obtained as the model curve of the focal point evaluation function. In this model curve 20, the correlation value of the peak at the focal point is 100. Also, it has been found that when normalization correlation search is effected, the focal point evaluation function obtained always assumes a curve substantially equal to the model curve 20 with the focal point as the center.

So, by the characteristic of the normalization correlation search model curve 20 being stored in advance in a memory, the difference to the focal point can be estimated quickly from the correlation value of pattern obtained. When for example, C1 is obtained as a correlation value of pattern by normalization correlation search, a focal position at which the correlation value is C1 in the normalization correlation search model curve 20, as shown in FIG. 9, is found. Since the focal point is already known, the difference $\delta z$ from that focal position to the focal point can be immediately found, and this difference $\delta z$ is an estimated value to the actual focal point. Accordingly, by the CPU 1 of FIG. 1 causing the lens drive system 13 by the use of the control signal S1 for lens portion to move the focal position by the difference $\delta z$, the focal position is immediately moved to the vicinity of the peak of the actual focal point evaluation function. Thereafter, focusing is effected near that peak by the ascending method or the like, whereby accurate focus detection is finally effected. At this time, as shown in FIG. 9, two focal positions at which the correlation value is e.g. C1 exist rightwardly and leftwardly of the focal point, but the current focal position can be easily discriminated by whether the correlation value becomes high or low when the focal position is shifted a little.

In the present embodiment, normalization correlation search is effected by the use of the image data of the template of which the gradation has been normalized and therefore, the focal position difference to the focal point can be found quickly from the correlation value of pattern obtained, and focus detection can be effected at a higher speed. Further, not only the image data of the template but also the image data which is the observation object to be searched may be subjected to the normalizing process. Again in this case, focus detection will be sped up.

Figure 10A:
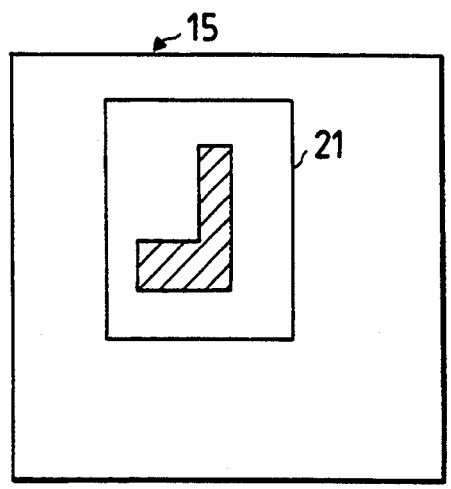
FIGS. 10A, 10B and 10C are graphs used for the illustration when image data is binarized to thereby find a focal point evaluation function.
Figure 10B:
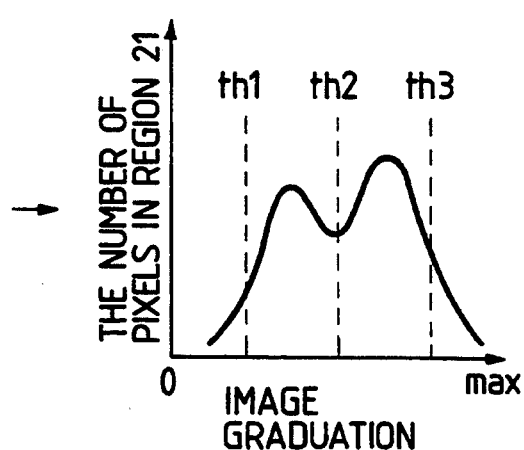
Figure 10C:
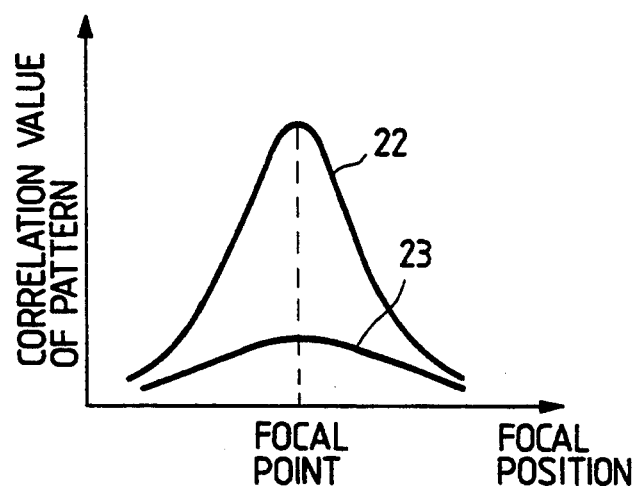

Besides the normalization of gradation, for example, a pre-process of binarizing image data will now be considered. When the template which is the object of this binarization is a pattern within an area 21 shown in FIG. 10A, it is to be understood that the distributed state of the gradation of pixels within this area 21 is represented by a solid line indicated in FIG. 10B. As threshold values for binarizing this image data, there are conceivable, for example, three kinds of threshold values $th1$, $th2$ and $th3$ ($th1<th2<th3$) shown in FIG. 10B. If a focal point evaluation function is to be found for an identical or similar pattern by the use of the image data of the template binarized by the threshold value $th2$, there is obtained the function 22 of FIG. 10C, and if a focal point evaluation function is to be found for an identical or similar pattern by the use of the image data of the template binarized by the threshold value $th1$ or $th3$, there is obtained the function 23 of FIG. 10C. The function 22 assumes a great peak at the focal point, while the function 23 does not assume a great peak even at the focal point and thus, there is the possibility of accurate focus detection being not accomplished. This means that if the image data is simply binarized, the shape of the focal point evaluation function will become irregular by the threshold value of the binarization. In contrast, according to the process of the present embodiment for normalizing the gradation, there can always be obtained substantially the same focal point evaluation function and focus detection can always be effected accurately and rapidly.

Third Embodiment

In a third embodiment, assuming that in the same image pickup field, there exist a plurality (N) of object patterns differing in focal positions, there is handled a case where focus detection is continuously and successively effected for those object patterns differing in focal position. The basic construction of the hardware of this third embodiment also is the same as the construction (FIG. 1) of the first embodiment, and the image data of templates are prepared in a similar procedure.

Figure 11:
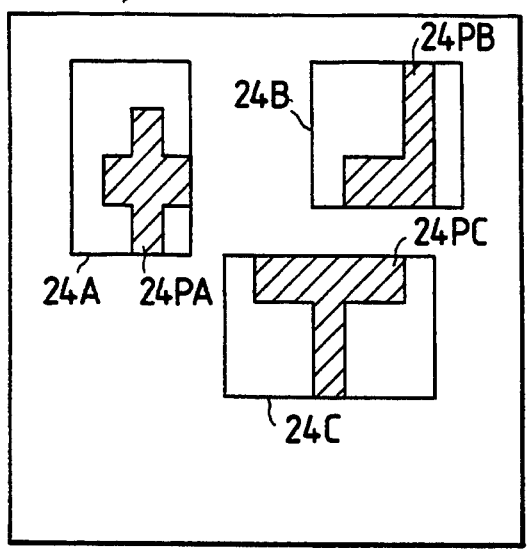
FIG. 11 is a diagram showing a plurality of templates in a third embodiment of the present invention.

First, as shown in FIG. 11, for example, three patterns P24A, P24B and P24C which provide templates are subjected to focusing in the observation screen 15 for a sample of which the focus detection is to be effected and are surrounded by windows W24A, W24B and W24C, respectively, whereby the image data of three templates T24A, T24B and T24C are extracted. These image data are stored in the external store 3 of FIG. 1. Then, a sample of which the image is to be actually picked up is introduced into the field of view, and the image data of a plurality of templates for focusing already stored are designated and down-loaded into the CPU 1.

Figure 12:
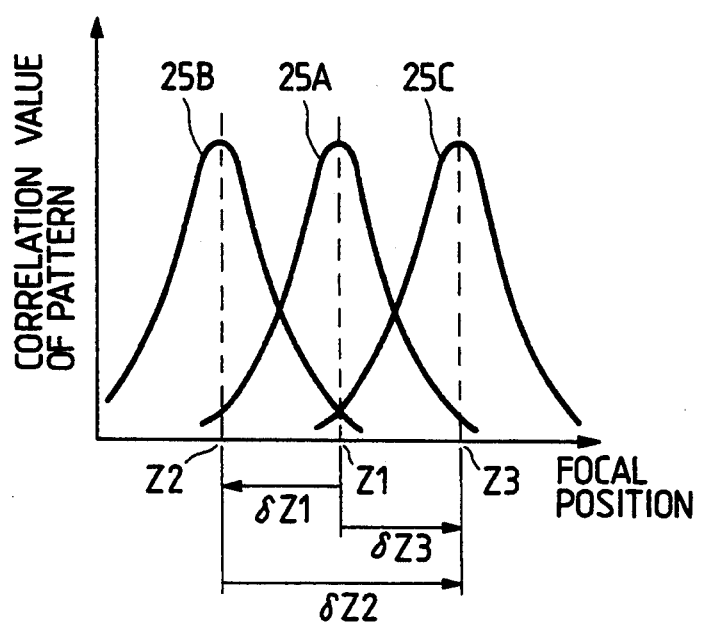
FIG. 12 is a graph showing focal point evaluation functions corresponding to the plurality of templates in the third embodiment.

Subsequently, candidate points at which the correlation value of pattern is high are searched in each template on the observation screen while the template to be used at the current focal position is replaced with another. At this time, depending on templates, it sometimes happens that on the observation screen, all the correlation values of pattern are below a predetermined candidate point detection level. In such case, the focal position is detected, and the detected focal position is changed at a predetermined step width and candidate points at which the correlation value of pattern is high are searched again, whereby candidate points are detected in all templates. On the other hand, for templates in which candidate points have been decided, the focal position is changed at the step width thereof and the focal point evaluation function is measured at each candidate point and finally, as shown in FIG. 12, there are obtained focal point evaluation functions 25A–25C in which focal points are Z1–Z3 for the three templates T24A, T24B and T24C, respectively. In this case, it is to be understood that $Z1-Z2=\delta Z1$, $Z2-Z3=-\delta Z2$ and $Z3-Z1=\delta Z3$ are established.

Then, the inter-peak focal position difference of the focal point evaluation function between any two templates is found and a focal position relative relation table as shown in Table 1 below is prepared.

TABLE 1

| Template | Template | T24A | T24B | T24C |
|---|---|---|---|---|
| | T24A | / | $-\delta Z1$ | $\delta Z3$ |
| | T24B | $\delta Z1$ | / | $\delta Z2$ |
| | T24C | $-\delta Z3$ | $-\delta Z2$ | / |

In this Table 1, for example, the numerical values $-\delta Z1$ and $\delta Z3$ on the horizontal axis along the template T24A mean that when the template T24A is the reference, the focal positions of the templates T24B and T24C differ by $-\delta Z1$ and $\delta Z3$, respectively.

Describing the way of using this focal position relative relation table, it is to be understood that focus detection is continuously effected in the pre-designated order of templates. In this case, the movement sequence of the focal position is prepared with reference to the focal position relative relation table and during the actual movement, the focal position is continuously adjusted in accordance with that movement sequence, whereby focus detection more efficient than individually effected focus detection becomes possible. Specifically, to effect focus detection to the template T24A, for example, after the template T24B, focus detection to the template T24B is completed, whereafter the focal position is shifted upwardly by $\delta Z1$ in accordance with Table 1, whereby focus detection can be effected very quickly.

Fourth Embodiment

The first to third embodiments handle a case where focus detection is effected to a specific pattern, while a fourth embodiment handles a case where focus detection is effected to an unspecific pattern. Again in the present embodiment, the basic construction of the hardware is the same as the construction (FIG. 1) of the first embodiment.

Figure 13A:
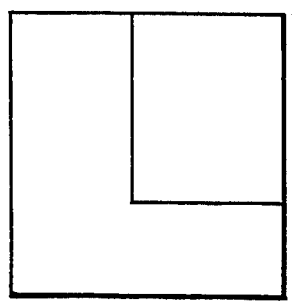
FIGS. 13A, 13B, 13C and 13D are diagrams showing examples of standard templates in a fourth embodiment of the present invention.
Figure 13B:
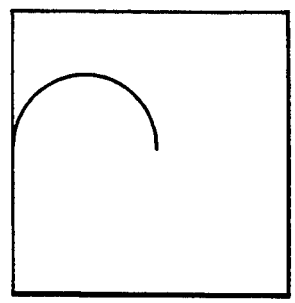
Figure 13C:
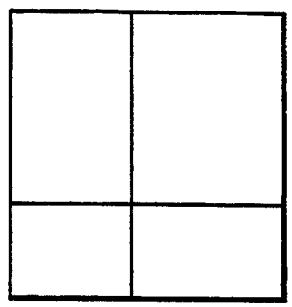
Figure 13D:
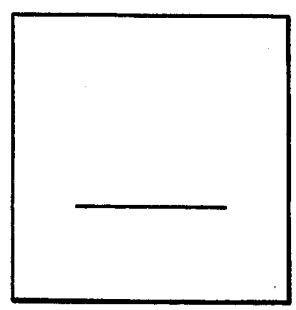
Figure 14:
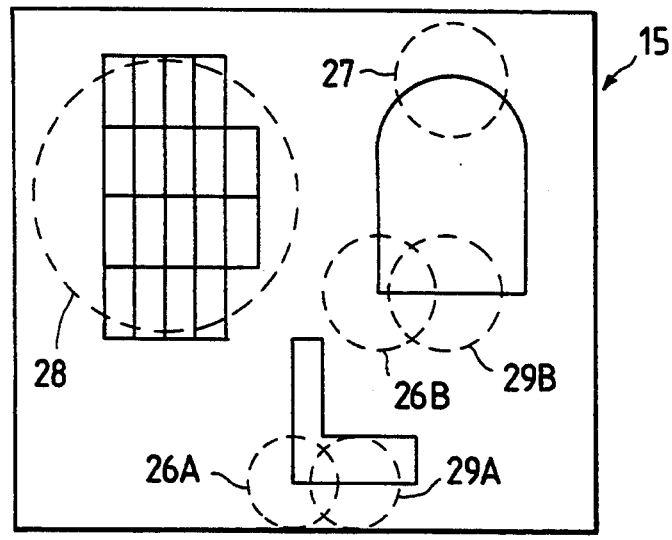
FIG. 14 is a diagram showing the observation screen of a sample of which the focus detection is effected in the fourth embodiment.

Generally, even when a sample of any shape is being observed, right-angled corner portions, a portion of an arc, lines of intersection and a short straight line exist in the picked-up image. Accordingly, the image data of patterns as shown in FIGS. 13A–13D are registered in advance as the image data of standard templates in the external store 3 of FIG. 1. Particularly, where the pattern which provides the reference for focus detection is not restricted, focus detection is executed by the use of such standard templates. In this case, the above-described normalization correlation process or the filter process of emphasizing the edge portions of patterns is conceivable as a pre-process for the templates and patterns to be searched, and by carrying out these pre-processes, stable focus detection can be executed even for linear images of which only the outline is clear-cut, or the like.

Where for example, the object of focus detection is an image as shown in FIG. 14, the correlation with the template of the right-angled corner of FIG. 13A is high in areas 26A and 26B, the correlation with the template of the arc of FIG. 13B is high in an area 27, the correlation with the template of the line of intersection of FIG. 13C is high in an area 28, and the correlation with the template of the short straight line of FIG. 13D is high in areas 29A and 29B. Accordingly, as in the first embodiment, the image data of the standard template of FIG. 13A is first down-loaded into the CPU 1, whereafter the image of the sample of FIG. 14 is picked up and the distribution of the degree of correlation of pattern in the whole image field is calculated. Thereby, the areas 26A, 26B, etc. are detected as candidate points at which the correlation value of pattern is high.

Subsequently, with the marginal area of the candidate points as the search area, any variation in the degree of correlation of pattern is monitored to thereby obtain focal point evaluation functions while the control signal S1 for lens portion is sent from the CPU 1 of FIG. 1 to the lens drive system 13. The focal position is driven into a position indicative of the peak value of one of these focal point evaluation functions which exhibits the highest peak value, whereby focus detection is executed. Likewise, focus detection can also be effected accurately by the use of the standard templates of FIGS. 13A–13D.

Particularly, where the image of the sample is, for example, an image having a sufficiently small level difference of the sample surface relative to the depth of focus of the image pickup system, like a microscopic image, focus detection can be effected sufficiently accurately by the technique shown in this fourth embodiment.

Where any images having various distances from a video camera to the object of image pickup are picked up, for example, by the video camera, the search area may be restricted to a predetermined area in the observation screen at the stage of the search of candidate points which determine an area for effecting focus detection accurately. In this manner, the degree of correlation of pattern is calculated only for a pattern in the predetermined area to find a focal point evaluation function and in conformity with the result of this, focus detection is executed, whereby focus detection can be effected at a higher speed.

Even when as in the above-described embodiments, one of the image pickup device, the optical system and the observation object is moved in the direction of the optical axis of the optical system, the relative positional relation among the image pickup device, the optical system and the observation object becomes varied. This also holds true when a part of the optical system is moved.

Thus, the present invention is not restricted to the above-described embodiments, but can assume various constructions without departing from the basic principles of the invention.

What is claimed is:

1. A focus detecting method comprising the steps of:
   (a) projecting a real image of an observation object including a plurality of object patterns onto an image pickup device through an optical system, and producing image data from an output of said image pickup device;
   (b) calculating correlation values of the image data of each of said plurality of object patterns and image data of a prestored reference pattern while varying a relative positional relation among said image pickup device, said optical system and said observation object in a direction of an optical axis of said optical system; and
   (c) judging the relative positional relation among said image pickup device, said optical system and said observation object which gives a maximum correlation value as an in-focus state.

2. A focus detecting method according to claim 1, wherein said calculating step includes:
   finding the correlation value of the image data of each of said plurality of object patterns and the image data of said reference pattern when said image pickup device, said optical system and said observation object are in a certain relative positional relation, selecting an object pattern for which said correlation value is a predetermined value or greater from among said plurality of object patterns,
   shifting the relative positional relation among said image pickup device, said optical system and said observation object from said certain relative positional relation to a relative positional relation differing therefrom, and finding the correlation value of the image data of said selected object pattern and the image data of said reference pattern with said image pickup device, said optical system and said observation object in said differing positional relation.

3. A focus detecting method according to claim 1, further including the steps of:
   displaying the real image of said observation object on a screen based on the image data produced from the output of said image pickup device; and
   relatively moving at least one of the real image of said observation object and said image pickup device in a direction perpendicular to said optical axis so that one of said plurality of object patterns for which the correlation with said reference pattern is highest is brought to a predetermined position on said screen.

4. A focus detecting method comprising the steps of:
   (a) projecting a real image of an observation object including a plurality of object patterns onto an image pickup device through an optical system, and producing image data from an output of said image pickup device;
   (b) normalizing the image data of each of said plurality of object patterns so that a difference between a maximum value and a minimum value of gradation of pixels represented by that image data becomes a predetermined value;
   (c) finding correlation values of the normalized image data of each of said object patterns and image data of a prestored reference pattern while varying a relative positional relation among said image pickup device, said optical system and said observation object in a direction of an optical axis of said optical system; and
   judging the relative positional relation among said image pickup device, said optical system and said observation object which gives a maximum correlation value as an in-focus state.

5. A focus detecting method according to claim 4, wherein said calculating step includes:
   finding the correlation value of the normalized image data of each of said object patterns and the image data of said reference pattern when said image pickup device, said optical system and said observation object are in a certain positional relation, selecting an object pattern for which said correlation value is a predetermined value or greater from among said plurality of object patterns,
   shifting the relative positional relation among said image pickup device, said optical system and said observation object from said certain relative positional relation to a relative positional relation differing therefrom, and finding the correlation value of the image data of said selected object pattern and the image data of said reference pattern with said image pickup device, said optical system and said observation object in said differing positional relation.

6. A focus detecting method according to claim 4, further including the steps of:
   displaying the real image of said observation object on a screen based on the image data produced from the output of said image pickup device; and
   relatively moving at least one of the real image of said observation object and said image pickup device in a direction perpendicular to said optical axis so that one of said plurality of object patterns for which the correlation with said reference pattern is highest is brought to a predetermined position on said screen.

7. A focus detecting apparatus including:
   an image pickup device for picking up a real image of an observation object including a plurality of object patterns through an optical system;
   drive means for driving at least one of said image pickup device, said optical system and said observation object in a direction of an optical axis of said optical system;
   first memory means for storing therein image data of said object patterns obtained from an output of said image pickup device;
   second memory means for prestoring image of data of a reference pattern therein;
   calculating means for calculating correlation values of the image data in said first memory means and the image data in said second memory means while controlling said drive means to vary a relative positional relation among said image pickup device, said optical system and said observation object; and
   judging means for judging the relative positional relation among said image pickup device, said optical system and said observation object which gives a maximum correlation value as an in-focus state.

8. A focus detecting apparatus according to claim 7, further including normalizing means for normalizing the image data of each of said object patterns so that a difference between a maximum value and a minimum value of gradation of pixels represented by that image data becomes a predetermined value, and wherein said first memory means stores therein the normalized image data of the object patterns.

9. A focus detecting apparatus according to claim 7, further including:
    display means for displaying the real image of said observation object on a screen based on the image data obtained from the output of said image pickup device; and
    moving means for relatively moving at least one of the real image of said observation object and said image pickup device in a direction perpendicular to said optical axis so that one of said plurality of object patterns for which the correlation with said reference pattern is highest can be brought to a predetermined position on said screen.

* * * * *